(12) United States Patent
Friedrich et al.

(10) Patent No.: US 6,979,132 B2
(45) Date of Patent: Dec. 27, 2005

(54) CYLINDRICAL ROLLER BEARING AND PROCESS FOR ITS ASSEMBLY

(75) Inventors: Hans-Jürgen Friedrich, Königsberg (DE); Bernhard Groschek, Donnersdorf (DE); Torbjörn Hedman, St Cyr sur Loire (FR); Rut Heemskerk, Poppenhausen-Kützberg (DE); Jürgen Stürzengerger, Schweinfurt (DE); Alfred Weidinger, Niederwerrn (DE)

(73) Assignee: AB SKF, Gothenburg (SE)

( * ) Notice: Subject to any disclaimer, the term of this patent is extended or adjusted under 35 U.S.C. 154(b) by 154 days.

(21) Appl. No.: 10/679,395

(22) Filed: Oct. 7, 2003

(65) Prior Publication Data

US 2004/0131296 A1    Jul. 8, 2004

(30) Foreign Application Priority Data

Oct. 8, 2002    (DE) ................................ 102 46 805

(51) Int. Cl.⁷ ......................... F16C 33/58; F16C 33/64; B21K 1/04
(52) U.S. Cl. ...................... 384/561; 384/489; 384/569; 384/903; 29/898.062
(58) Field of Search ............................... 384/559, 560, 384/561, 564, 569, 903, 486; 29/898.061, 29/898.062, 898.07

(56) References Cited

U.S. PATENT DOCUMENTS

| | | | |
|---|---|---|---|
| 1,512,020 A | | 10/1924 | Graham |
| 1,736,959 A | | 11/1929 | Gibbons |
| 1,970,449 A | * | 8/1934 | Gibbons et al. ............. 384/570 |
| 1,985,693 A | * | 12/1934 | Robinson ................ 29/898.062 |
| 2,718,441 A | * | 9/1955 | Smith .......................... 384/484 |
| 2,767,037 A | | 10/1956 | Williams |
| 3,140,129 A | | 7/1964 | Koss |
| 3,306,687 A | | 2/1967 | Smith |
| 3,752,543 A | | 8/1973 | Schmidt |
| 4,154,491 A | | 5/1979 | Derner et al. |
| 4,558,962 A | * | 12/1985 | Meinlschmidt ............. 384/570 |
| 4,995,736 A | * | 2/1991 | Haase et al. ................ 384/903 |
| 5,005,992 A | * | 4/1991 | Dreschmann et al. ....... 384/484 |

FOREIGN PATENT DOCUMENTS

| | | |
|---|---|---|
| AT | 289476 | 4/1971 |
| DE | 1 819 230 | 10/1960 |
| DE | 7037239 | 1/1971 |
| DE | 24 41 121 | 3/1976 |
| DE | 198 45 671 | 4/2000 |
| DE | 296 23 928 | 11/2000 |
| EP | 0 649 990 A1 | 4/1995 |
| FR | 501258 | 4/1920 |

* cited by examiner

Primary Examiner—Thomas R. Hannon
(74) Attorney, Agent, or Firm—Buchanan Ingersoll

(57) ABSTRACT

A cylindrical roller bearing includes an outer bearing ring, an inner bearing ring and cylindrical rollers located between the outer and inner bearing rings. One of the rings has side rims forming an axial stop for the cylindrical rollers. The bearing ring on which the side rims are not provided is formed with at least one groove outside the axial extension of the cylindrical rollers. A ring of spring-elastic material is positioned in the groove to form an axial stop for the cylindrical rollers. The periphery of the ring has no interruptions. To improve the running behavior of the cylindrical roller bearing, the ring possesses a V-shaped cross-section with two legs.

17 Claims, 2 Drawing Sheets

CYLINDRICAL ROLLER BEARING AND PROCESS FOR ITS ASSEMBLY

This application is based on and claims priority under 35 U.S.C. § 119 with respect to German Application No. 102 46 805.2 filed on Oct. 8, 2002, the entire content of which is incorporated herein by reference.

FIELD OF THE INVENTION

This invention generally relates to a roller bearing and a process for assembling a roller bearing. More particularly, the invention pertains to a cylindrical roller bearing having an outer bearing ring, an inner bearing ring, cylindrical rollers located between the outer and inner bearing rings, and a ring forming an axial stop for the rollers, and a process for assembling such a bearing.

BACKGROUND OF THE INVENTION

A cylindrical roller bearing is known from U.S. Pat. No. 1,736,959. The disclosed cylindrical roller bearing inner and outer rings, with cylindrical rollers located between the outer and inner rings. The cylindrical roller bearing is prevented from falling out with a rimless outer ring by the fact that in the outer ring outside the axial extension of the cylindrical rollers there are grooves into which one snap ring at a time is inserted. The snap rings result in a unit consisting of the inner ring, the outer ring and roller bodies, with the roller bodies not being able to fall out. Furthermore the snap rings are able to accommodate slight axial forces.

In a cylindrical roller bearing of this type, it has been found that the bearing runs relatively noisily because the cylindrical rollers with their axial end face adjoin the snap ring and thus cause noise. Furthermore, relatively high wear can occur in the bearing.

SUMMARY OF THE INVENTION

Generally speaking, the present invention provides a cylindrical roller bearing which, through implementation of an economical approach, allows axial impacts to be elastically and relatively softly captured by the ring without an excessively large amount of space being required. In addition, a relatively simple mounting of the bearing is provided, with wear in the bearing which occurs during operation being reduced compared to prior approaches such as discussed above.

The invention relates to a cylindrical roller bearing with an outer bearing ring, an inner bearing ring and cylindrical rollers located between the outer bearing ring and inner bearing ring. One of the bearing rings possesses side rims which form an axial stop for the cylindrical rollers. With respect to the ring on which the side rims are not located, at least one groove is formed outside the axial extension of the cylindrical rollers. A ring of spring-elastic material is inserted into this groove and forms an axial stop for the cylindrical roller. In addition, the periphery of the ring is not provided with any interruptions, and the ring has a V-shaped cross-section possessing two-legs.

Preferably, with respect to the bearing ring on which the side rims are not located outside the axial extension of the cylindrical rollers, one groove at a time is formed on each side of the cylindrical rollers, and a ring of spring-elastic material is inserted into each of these grooves.

Advantageously, the ring at the site where the two legs join one another is pointed or directed towards the face of the cylindrical rollers or the ring adjoins surface. The bearing can be configured so that a distance exists between at least one connecting point of the ring or its legs and the face of the cylindrical rollers in the operating state of the cylindrical roller bearing. This distance can be between 0.1 mm and 1 mm, preferably between 0.2 mm and 0.5 mm according to the development.

The ring is preferably produced from spring steel. Also, the groove can be made as a peripheral ring groove.

Preferably, a seal with a sealing lip is mounted, attached or provided on the ring. This sealing lip can adjoin the bearing ring on which the side rims are located such as through contact or engagement. The seal can be advantageously vulcanized on the ring.

The configuration of the cylindrical roller bearing helps facilitate the holding together of all bearing parts, especially when using a full-type cylindrical roller bearing. The rubbing of the rollers on the ring is also reduced or minimized by the V-shaped execution of the ring. Consequently there is only relatively little wear during the operation of the cylindrical roller bearing so that the noise development is relatively low.

The configuration of the ring also helps facilitate relatively soft and elastic accommodation of the axial impacts during the operation of the cylindrical roller bearing. The structure of the bearing is generally characterized by a relatively low space requirement; thus making it possible for the cylindrical rollers to be made longer. The groove which is provided for holding the ring need not be very deep and so the wall thickness of the bearing ring (outer bearing ring or inner bearing ring) can be reduced.

Another aspect of the invention involves a process for assembling a cylindrical roller bearing. The process involves bringing together an inner bearing ring and cylindrical rollers to form a premounted assembly, with the inner bearing ring comprising side rims forming an axial stop for the cylindrical rollers, and axially pushing an outer bearing ring onto the premounted assembly comprised of the inner bearing ring and the cylindrical rollers, the outer bearing ring comprising at least one groove. At least one ring of spring-elastic material is axially pressed into the groove. The ring has a periphery provided with no interruptions and possesses a V-shaped cross-section with two legs forming an angle between one another. The ring is axially pressed into the groove by elastically reducing the angle between the two legs of the ring so that the outside diameter of the ring is reduced to permit introduction of the ring into the groove.

According to another aspect, a process for assembling a cylindrical roller bearing involves bringing together an outer bearing ring and cylindrical rollers to form a premounted assembly, with the outer bearing ring comprising side rims forming an axial stop for the cylindrical rollers, and axially pushing an inner bearing ring onto the premounted assembly comprised of the outer bearing ring and the cylindrical rollers, with the inner bearing ring comprising at least one groove. At least one ring of spring-elastic material is axially pressed into the groove. The ring has a periphery without interruptions and possesses a V-shaped cross-section with two legs forming an angle between one another. The ring is axially pressed into the groove by elastically reducing the angle between the two legs of the ring so that the inside diameter of the ring is increased to permit introduction of the ring into the groove.

The process for assembling the bearing can be implemented relatively easily because the ring can easily snap into the groove or can be pressed into the groove.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION

Figure 1:
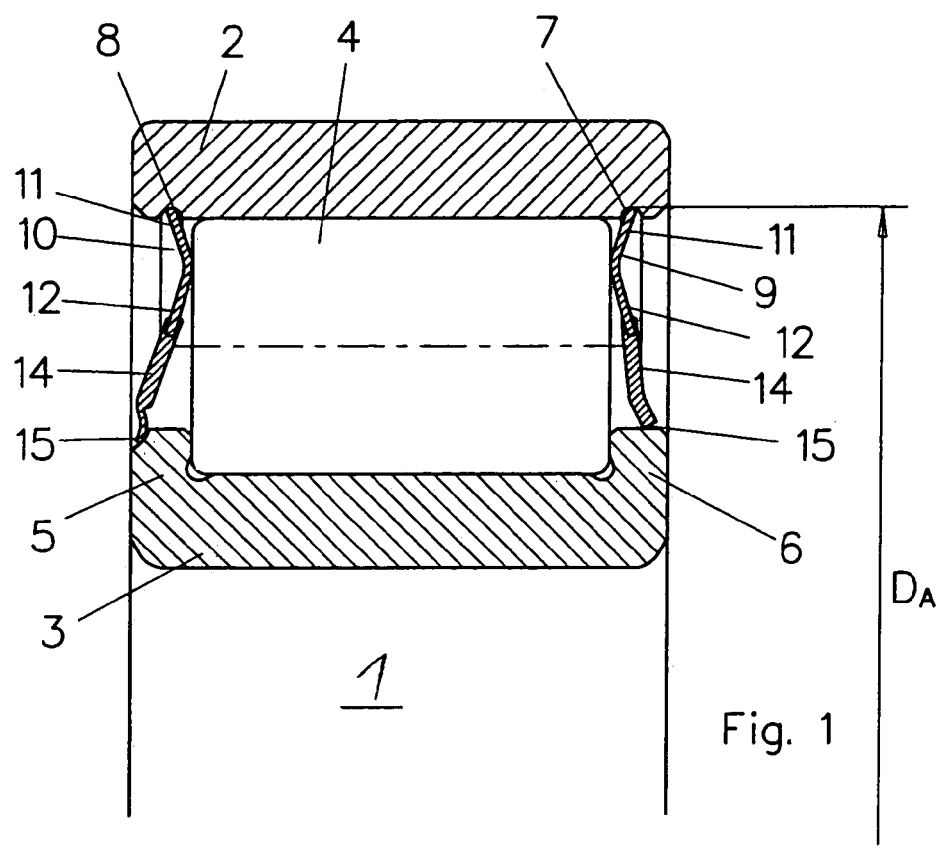
FIG. 1 is a cross-sectional view through a cylindrical roller bearing according to one embodiment of the invention.

Referring to FIG. 1, a cylindrical roller bearing 1 includes an outer bearing ring 2 and an inner bearing ring 3, with cylindrical rollers 4 arranged between the outer and inner bearing rings 2, 3. The inner bearing ring 3 has side rims 5, 6 at opposite axial ends of the bearing/ring. These side rims 5, 6 extend generally radially outwardly toward the outer bearing ring and constitute an axial stop for the cylindrical rollers.

The outer bearing ring 2 over the axial extent of the cylindrical rollers 4 is provided with a race for the cylindrical rollers 4. Axially outside this area, two annularly running grooves 7, 8 are machined or otherwise formed in the outer bearing ring 2. Each of these grooves 7, 8 is intended to hold or receive a respective ring or annular member 9, 10 made of spring-elastic material such as spring steel. Also, the grooves can be made as a peripheral ring groove.

Figure 2:
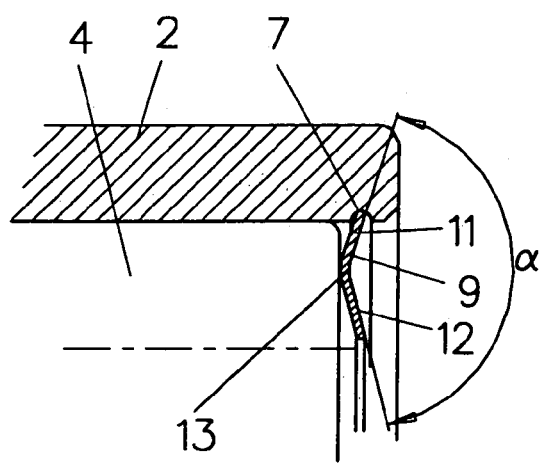
FIG. 2 is an enlarged cross-sectional view of a portion of the cylindrical roller bearing shown in FIG. 1.

As is especially apparent from FIG. 2, each ring 9, 10 has two legs 11, 12 which meet at or are joined at a connecting point or connecting region 13. The two legs 11, 12 intersect one another so that they are positioned in a non-coplanar relationship with one another. In the illustrated version, the rings 9, 10 possess a V-shaped cross-section. The two legs 11, 12 thus form an interior angle $\alpha$ as shown in FIG. 2. Also, the ring has a periphery that has no interruptions.

Figure 3:
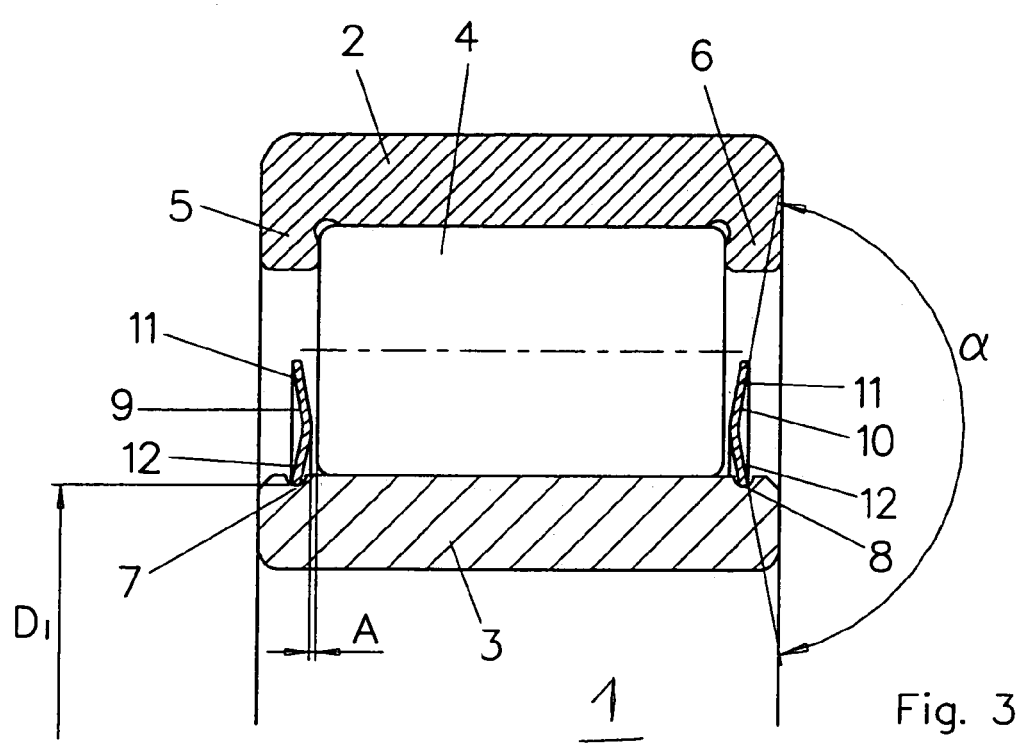
FIG. 3 is a cross-sectional view through a cylindrical roller bearing according to another embodiment of the invention.

The ring at the point or region where the two legs 11, 12 join one another can be pointed or directed towards the face of the cylindrical rollers or the ring adjoins surface. In normal operation of the cylindrical roller bearing, there can be a distance A between the connecting point/region 13 of the two legs 11, 12 of the respective rings 9, 10 and the face of the cylindrical rollers 4 such as illustrated in FIG. 3. This distance can be between 0.1 mm and 1 mm, preferably between 0.2 mm and 0.5 mm.

As can be seen from FIG. 1, a seal 14 with a sealing lip 15 is provided on each of the rings 9, 10. The seal 14 with the sealing lip 15 can be vulcanized on the respective ring.

The two rings 9, 10 shown in FIG. 1 are provided with alternative embodiments or configurations for the seal 14 and sealing lip 15. In both illustrated versions, the sealing lip 15 contacts or engages the bearing ring 2, 3 which does not hold or receive the ring 9, 10. In one version, the sealing lip 15 engages or contacts the inner peripheral surface of the side rim of the inner bearing ring, while in the other version the sealing lip contacts or engages the axially facing outer end surface of the inner bearing ring (e.g., contacts or engages a slightly recessed region formed on the side rim).

The illustrated bearing can be assembled in the following manner. With respect to the assembly of the bearing shown in FIG. 1, first the cylindrical rollers 4 are located on the inner bearing ring 3 to form a premounted assembly. Here, the side rims 5, 6 of the inner bearing ring 3 form an axial stop for the cylindrical rollers. Then the outer ring 2 is pushed axially onto this premounted assembly that includes the inner ring 3 and the cylindrical rollers 4. The cylindrical roller bearing 1 is then assembled into a unit by mounting the rings 9, 10. To do this, the rings 9, 10 are elastically deformed by axially pushing from the side in the direction of the respective groove 7, 8 such that the outside diameter $D_A$ of the annular ring 9, 10 is reduced. This thus causes the angle $\alpha$ between the two legs 11, 12 to be reduced. When the rings 9, 10 reach the respective grooves 7, 8, they snap back into the original shape due to their spring-elastic behavior and are placed securely in the groove 7, 8 in the illustrated manner.

The approach shown in FIG. 3 is similar, although here the inner bearing ring 3 bears the rings 9, 10. That is, the grooves 7, 8 which receive the rings 9, 10 are provided in the inner bearing ring 3. In this version, the inside diameter $D_I$ of the rings 9, 10 is increased when the rings 9, 10 are axially pushed until they snap into the respective groove 7, 8 and thus reach their final position. More specifically, the assembly process here involves first bringing together the outer bearing ring 2 and the cylindrical rollers 4 to form a premounted assembly. The inner bearing ring 2 is then axially pushed onto or into the premounted assembly comprised of the outer bearing ring 3 and the cylindrical rollers 4. The rings 9, 10 are then axially pressed into the respective groove 7, 8 by elastically reducing the angle $\alpha$ between the two legs 11, 12 of the rings so that the inside diameter of the ring is increased to permit introduction of the ring 9, 10 into the respective groove 7, 8.

Although not specifically shown in FIG. 3, it is to be understood that each of the rings 9, 10 can also be provided with a seal 14 having a sealing lip 15 similar to that shown in FIG. 1. If such a seal is utilized, the sealing lip 15 can contact or engage the outer bearing ring in either of the ways shown by way of example in FIG. 1.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. Cylindrical roller bearing comprising:
   an outer bearing ring;
   an inner bearing ring;
   cylindrical rollers located between the outer bearing ring and the inner bearing ring;
   one of the inner and outer bearing rings comprising side rims forming an axial stop for the cylindrical rollers;
   at least one groove provided at the inner or outer bearing ring which does not include the side rims, the at least one groove being positioned axially outside the cylindrical rollers;

a ring of spring-elastic material positioned in the at least one groove to form an axial stop for the cylindrical rollers;

the ring having a periphery provided with no interruptions; and the ring possessing a V-shaped cross-section with two legs.

2. The cylindrical roller bearing according to claim 1, wherein the at least one groove comprises a pair of grooves, each groove being provided on the inner or outer bearing which does not comprise side rims and being located outside the axial extension of the cylindrical rollers, the ring of spring-elastic material being positioned in one of the grooves and comprising another ring of spring-elastic material in the other groove.

3. The cylindrical roller bearing according to claim 1, wherein the two legs of the ring join one another at a region of the ring that is directed towards a face of the cylindrical rollers that faces towards the ring.

4. The cylindrical roller bearing according to claim 3, wherein the region of the ring at which the legs of the ring join one another is spaced by a distance from the face of the cylindrical rollers in an operating state of the cylindrical roller bearing.

5. The cylindrical roller bearing according to claim 4, wherein the distance is between 0.1 mm and 1 mm.

6. The cylindrical roller bearing according to claim 4, wherein the distance is between 0.2 mm and 0.5 mm.

7. The cylindrical roller bearing according to claim 1, wherein the ring is made of spring steel.

8. The cylindrical roller bearing according to claim 1, wherein the groove is formed as a peripheral ring groove.

9. The cylindrical roller bearing according to claim 1, comprising a seal on the at least one ring, the seal comprising a sealing lip.

10. The cylindrical roller bearing according to claim 9, wherein the sealing lip contacts the inner or outer bearing ring on which are provided the side rims.

11. The cylindrical roller bearing according to claim 9, wherein the seal is vulcanized on the at least one ring.

12. Process for assembling a cylindrical roller bearing comprising:

bringing together an inner bearing ring and cylindrical rollers to form a premounted assembly, the inner bearing ring comprising side rims forming an axial stop for the cylindrical rollers;

axially pushing an outer bearing ring onto the premounted assembly comprised of the inner bearing ring and the cylindrical rollers so that the cylindrical rollers are positioned between the inner and outer bearing rings, the outer bearing ring comprising at least one groove; and axially pressing at least one ring of spring-elastic material into the groove, the ring having a periphery provided with no interruptions and possessing a V-shaped cross-section with two legs forming an angle between one another, the ring being axially pressed into the groove by elastically reducing the angle between the two legs of the ring so that an outside diameter of the ring is reduced to permit introduction of the ring into the groove.

13. The process according to claim 12, wherein the ring is a first ring and the groove is a first groove located adjacent one axial end of the outer bearing ring, the outer bearing ring comprising a second groove located adjacent an opposite axial end of the outer bearing ring, the process comprising axially pressing a second ring of spring-elastic material into the second groove, the second ring possessing a V-shaped cross-section with two legs forming an angle between one another, the second ring being axially pressed into the second groove by elastically reducing the angle between the two legs of the second ring so that an outside diameter of the second ring is reduced to permit introduction of the second ring into the second groove.

14. The process according to claim 12, wherein a seal comprising a sealing lip is provided on the at least one ring, the at least one ring being axially pressed into the groove so that the sealing lip contacts the inner bearing ring.

15. Process for assembling a cylindrical roller bearing comprising:

bringing together an outer bearing ring and cylindrical rollers to form a premounted assembly, the outer bearing ring comprising side rims forming an axial stop for the cylindrical rollers;

axially pushing an inner bearing ring onto the premounted assembly comprised of the outer bearing ring and the cylindrical rollers so that the cylindrical rollers are located between the inner and outer bearing rings, the inner bearing ring comprising at least one groove; and axially pressing at least one ring of spring-elastic material into the groove, the ring having a periphery without interruptions possessing a V-shaped cross-section with two legs forming an angle between one another, the ring being axially pressed into the groove by elastically reducing the angle between the two legs of the ring so that an inside diameter of the ring is increased to permit introduction of the ring into the groove.

16. The process according to claim 15, wherein the ring is a first ring and the groove is a first groove located adjacent one axial end of the inner bearing ring, the inner bearing ring comprising a second groove located adjacent an opposite axial end of the inner bearing ring, the process comprising axially pressing a second ring of spring-elastic material into the second groove, the second ring possessing a V-shaped cross-section with two legs forming an angle between one another, the second ring being axially pressed into the second groove by elastically reducing the angle between the two legs of the second ring so that an outside diameter of the second ring is reduced to permit introduction of the second ring into the second groove.

17. The process according to claim 15, wherein a seal comprising a sealing lip is provided on the at least one ring, the at least one ring being axially pressed into the groove so that the sealing lip contacts the outer bearing ring.

* * * * *